(12) United States Patent
McConnell

(10) Patent No.: US 8,100,428 B2
(45) Date of Patent: Jan. 24, 2012

(54) HITCH APPARATUSES

(76) Inventor: David McConnell, Polson, MT (US)

( * ) Notice: Subject to any disclaimer, the term of this patent is extended or adjusted under 35 U.S.C. 154(b) by 0 days.

(21) Appl. No.: 12/843,752

(22) Filed: Jul. 26, 2010

(65) Prior Publication Data

US 2010/0289249 A1 Nov. 18, 2010

Related U.S. Application Data

(63) Continuation of application No. 12/316,395, filed on Dec. 11, 2008, now Pat. No. 7,793,967.

(51) Int. Cl.
*B60D 1/54* (2006.01)
(52) U.S. Cl. ..................... 280/491.1; 280/506
(58) Field of Classification Search ............... 280/491.1, 280/491.3, 491.4, 491.5, 494, 444, 506
See application file for complete search history.

(56) References Cited

U.S. PATENT DOCUMENTS

| | | | |
|---|---|---|---|
| 2,717,164 A | 9/1955 | Meyer | |
| 3,640,550 A | 2/1972 | Pearson | |
| 4,073,508 A * | 2/1978 | George et al. | 280/478.1 |
| 4,109,930 A | 8/1978 | Pilhall | |
| D258,357 S | 2/1981 | Jackson | |
| 4,350,362 A | 9/1982 | Landers | |
| 4,482,167 A | 11/1984 | Haugrud | |
| 4,807,900 A | 2/1989 | Tate | |
| 4,856,805 A * | 8/1989 | Davis | 280/491.4 |
| D317,426 S | 6/1991 | Lytle | |
| 5,048,854 A | 9/1991 | Clark | |
| 5,322,315 A * | 6/1994 | Carsten | 280/479.2 |
| 5,342,076 A | 8/1994 | Swindall | |
| 5,516,140 A * | 5/1996 | Hinte | 280/494 |
| 5,727,805 A | 3/1998 | La Roque | |
| 5,806,872 A * | 9/1998 | Szczypski | 280/479.2 |
| 5,839,759 A * | 11/1998 | Trigo | 280/762 |
| 5,906,387 A | 5/1999 | Wallace | |
| D455,105 S | 4/2002 | Lagalo | |
| 6,382,655 B1 | 5/2002 | Mosdal et al. | |
| 6,527,292 B2 * | 3/2003 | Adair | 280/491.3 |
| 6,682,086 B1 | 1/2004 | Erickson | |
| 6,729,637 B2 | 5/2004 | Wolters et al. | |
| 7,052,032 B1 * | 5/2006 | Adair | 280/479.3 |
| 7,134,679 B2 | 11/2006 | Krstovic | |
| 7,156,433 B2 | 1/2007 | Evans | |
| 7,510,204 B2 * | 3/2009 | Inoue et al. | 280/491.3 |
| 7,669,876 B2 | 3/2010 | Kerpash | |
| 2006/0232043 A1 * | 10/2006 | Inoue et al. | 280/515 |
| 2007/0080516 A1 | 4/2007 | Simmons | |

* cited by examiner

*Primary Examiner* — Tashiana Adams
(74) *Attorney, Agent, or Firm* — Wells St. John P.S.

(57) ABSTRACT

The present invention is a configurable trailer hitch that provides an extended towing position for transferring a tractor force to a load, and a retracted storage position for safely stowing the hitch under a towing vehicle. The trailer hitch has a spring loaded retaining pin which engages a hitch receiver when the trailer hitch is placed in the towing position, and a storage latch adapted to hold the hitch receiver when the trailer hitch is placed in the storage position.

9 Claims, 4 Drawing Sheets

US 8,100,428 B2

HITCH APPARATUSES

RELATED PATENT DATA

This patent resulted from a continuation application of U.S. patent application Ser. No. 12/316,395, filed Dec. 11, 2008 now U.S. Pat. No. 7,793,967, entitled "Configurable Trailer Hitch Apparatus", naming David McConnell as inventor, the disclosure of which is incorporated by reference.

TECHNICAL FIELD

The present invention relates to trailer hitches and more particularly to a configurable trailer hitch that can easily be transitioned from a towing position to a stored position.

BACKGROUND OF THE INVENTION

Trailer hitches of many varieties have been available to mount to the frame of towing vehicles and adapted to couple to towable vehicles such as trailers. Typically, a towing ball is mounted on an arm that extends outwardly from the towing vehicle. This arrangement is advantageous when towing a trailer because it provides a convenient coupling point, providing ample space for turning and maneuvering. However, a tripping and collision hazard is presented to persons passing by the rear of the vehicle when the towing ball is uncoupled. As a remedy, many trailer hitches provide a means to remove the arm and ball when not in use. However, most trailer hitches make no provision for storing the arm and ball either on or in the vehicle which increases the probability of loss or unavailability of the arm and ball when they are needed.

There have been various attempts to provide a ball and arm that can be rotated from a towing position to a stored position such as shown in U.S. Pat. No. 4,109,930 to Philall that shows a pivotally mounted tow bar which may be pivoted to a retracted position. This reference teaches a retractable tow bar that is tucked inside a bumper utilizing a spring loaded locking arrangement. Another reference, U.S. Pat. No. 6,527,292 to Adair shows a trailer hitch that can be mounted in both a towing and storage position.

Despite these and other offerings, there continues to be a need for a configurable trailer hitch that can be mounted on a vehicle that can easily be transitioned between a storage position and towing position without the use of tools.

SUMMARY OF THE INVENTION

A first aspect of the present invention is a configurable trailer hitch apparatus having a towing position for exerting a tractor force on a load, and a storage position, which includes a frame member adapted to mount to a towing vehicle, a top plate fastened to the frame member, a bottom weldment positioned in parallel relation to the top plate, a hitch receiver positioned in pivoting relation between the top plate and bottom weldment, a pivot pin positioned through a plurality of apertures formed in the frame member, top plate, bottom weldment, and hitch receiver, and forming a pivot therein, a hitch ball assembly fastened to the hitch receiver, and operable to couple to the load when the apparatus is configured in the towing position, a retaining pin positioned through the top plate and bottom weldment, and operable to hold the hitch receiver when the apparatus is configured in the towing position, and a storage latch mounted to the frame member and operable to grasp the hitch receiver when the apparatus is configured in the storage position.

Another aspect of the present invention is a configurable trailer hitch that is placed in a towing position by swinging the hitch receiver from an intermediate position while exerting a downward force on the retaining pin until the aperture formed in the wing of the hitch receiver aligns with the retaining pin, and then releasing the retaining pin so that it engages with the aperture formed in the wing.

Yet another aspect of the present invention is a configurable trailer hitch that is placed in a storage position first by exerting a downward force on the retaining pin, and then swinging the hitch receiver in a direction toward the frame member so that it engages the storage latch and is held in the storage position.

These and other aspects of the present invention will be discussed in greater detail hereinafter.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
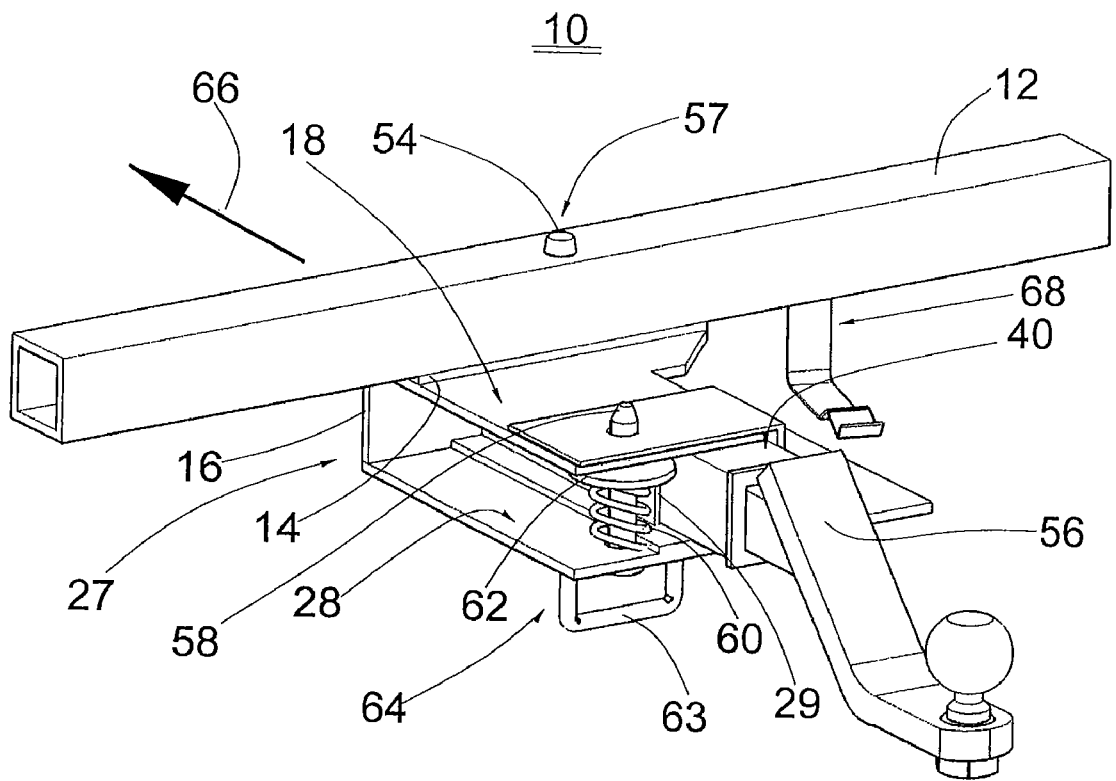
FIG. 1 is an isometric view of the configurable trailer hitch shown in the towing position.

Referring now to FIG. 1 there is shown an isometric view of a configurable trailer hitch apparatus 10 arranged in a towing position. The frame member 12 is adapted to attach to a pair of left and right members (not shown) located on an underside of a vehicle (not shown). The frame member 12 is fabricated from a metal tube of suitable construction and size to transfer or couple a towing or tractor load to a vehicle.

A spacer plate 14 is welded to a side of the frame member 12. A wall plate 16 is welded to the frame member 12, and to the spacer plate 14. A top plate 18 is welded to the spacer plate 14, and extends in a perpendicular manner from the wall plate 16.

Figure 2:
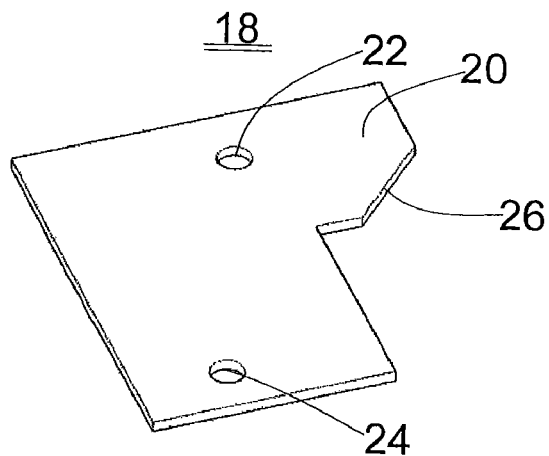
FIG. 2 is an isometric view of the top plate.

Referring to FIG. 1 and FIG. 2, the top plate 18 is fabricated from a plate 20 having a first aperture 22 and a second aperture 24 formed therein. The plate 20 has a first edge 26 positioned at an oblique angle.

Figure 3:
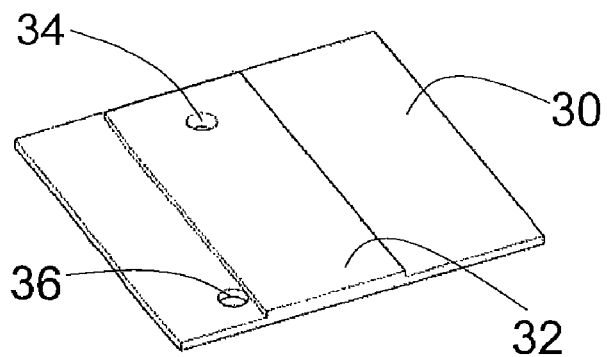
FIG. 3 is an isometric view of the bottom plate.

Now referring to FIG. 1 and FIG. 3, a bottom weldment 28 is welded to the wall plate 16, extending in perpendicular relation to the wall plate 16, and in parallel relation to the top plate 18. The bottom weldment 28 is fabricated by welding a lower plate 30 to a second spacer plate 32. A third aperture 34 is formed in the second spacer plate 32 and the lower plate 30. A fourth aperture 36 is formed in the lower plate 30. One skilled in the art would readily recognize that the bottom weldment 28 could be formed from a single piece of material using an appropriate milling operation on a single piece of material.

A backstop plate 29 (FIG. 1 and FIG. 7) is mounted in a vertical manner and welded between the top plate 18 and the bottom weldment 28. The backstop plate 29 extends to, and is welded to the wall plate 16. The top plate 18, wall plate 16, and bottom weldment 28, and backstop plate 29 define a welded assembly 27 that is itself welded to the spacer plate 14 and to the frame member 12.

Figure 4:
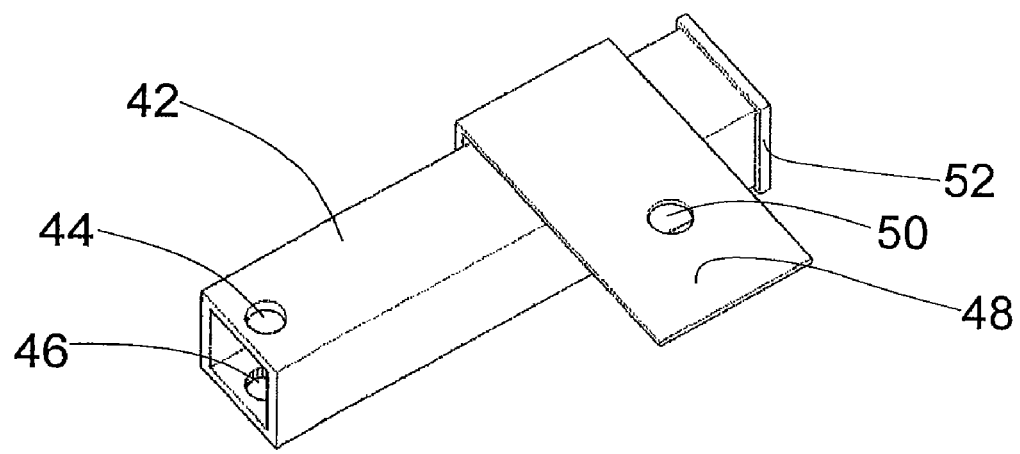
FIG. 4 is an isometric view of the hitch receiver.

Now referring to FIG. 1 and FIG. 4, a hitch receiver 40 is formed from a tube 42 having a fifth aperture 44 and a sixth aperture 46 formed therein. A wing 48 is welded to an outer wall of the tube 42 and extends outward in a transverse manner. A seventh aperture 50 is formed in the wing 48. A collar 52 is fabricated on the tube 42.

The hitch receiver 40 is positioned between the top plate 18 and the bottom weldment 28, and is placed in aligned relation so that the fifth aperture 44 is aligned with the first aperture 22 (FIG. 2), and the sixth aperture 46 is aligned with the third aperture 34 (FIG. 3). A pivot pin 54 is inserted through the frame member 12, and through the first, third, fifth, and sixth apertures labeled by the numerals 22, 34, 44 and 46 respectively forming a pivot 57. A hitch ball assembly 56 is inserted into the hitch receiver 40 and held in place by a lynch pin (not shown).

Now referring to FIG. 1-FIG. 4, a pin 58 is positioned through the fourth aperture 36 in the bottom weldment 28, and through the second aperture 25 of the top plate 18. A spring 60, retainer 62, and a handle 63 are assembled on the pin 58 forming a retaining pin 64. The retaining pin 64 is inserted through the seventh aperture 50 on the wing 48 when the configurable trailer hitch 10 is maintained in a towing position as shown in FIG. 1. In this configuration, a towing force 66 provided by the vehicle (not shown) intersects or is centered about the pivot 57.

Figure 5:
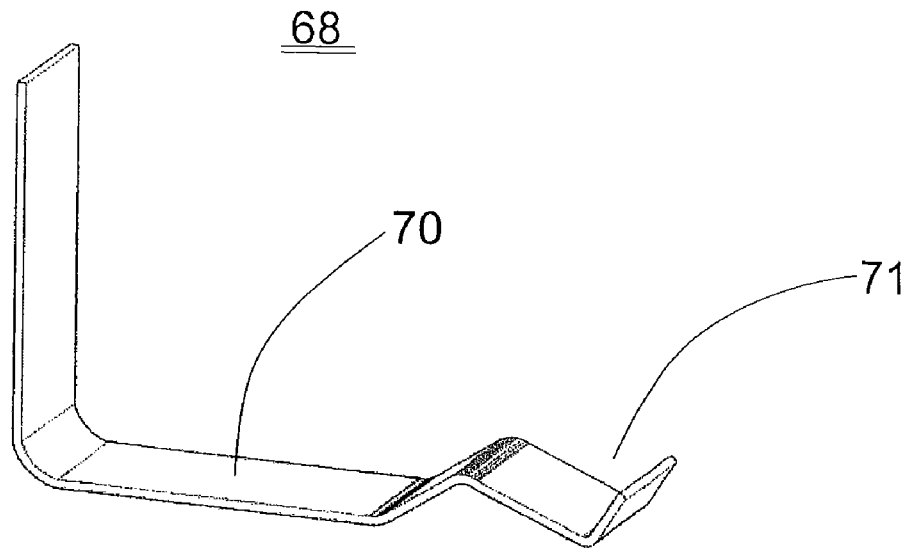
FIG. 5 is an isometric view is the storage latch.

Now referring to FIGS. 1 and 5, a storage latch 68 is welded to the frame member 12. The storage latch 68 is formed from a strip of metal 70 and has a shape that includes an outer lip 71 useful for holding the hitch receiver 40 when it is placed in the storage position.

Figure 6:
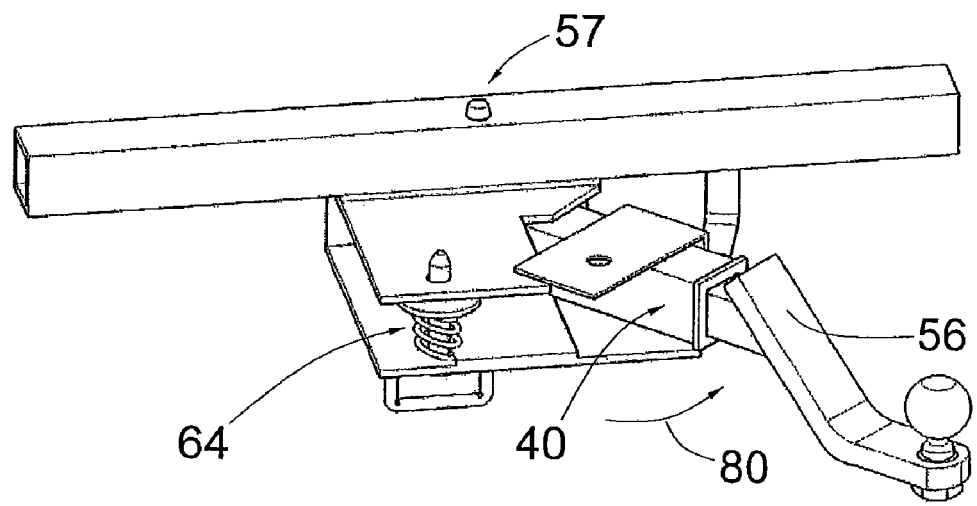
FIG. 6 an isometric view of the configurable trailer hitch in an intermediate position.

Now referring to FIG. 6 the configurable trailer hitch 10 is shown in an intermediate position. Here, the hitch receiver 40 and the hitch ball assembly 56 have been released by the pivot pin 64 and rotated about the pivot 57 in a direction generally indicated by the arrow 80.

Figure 7:
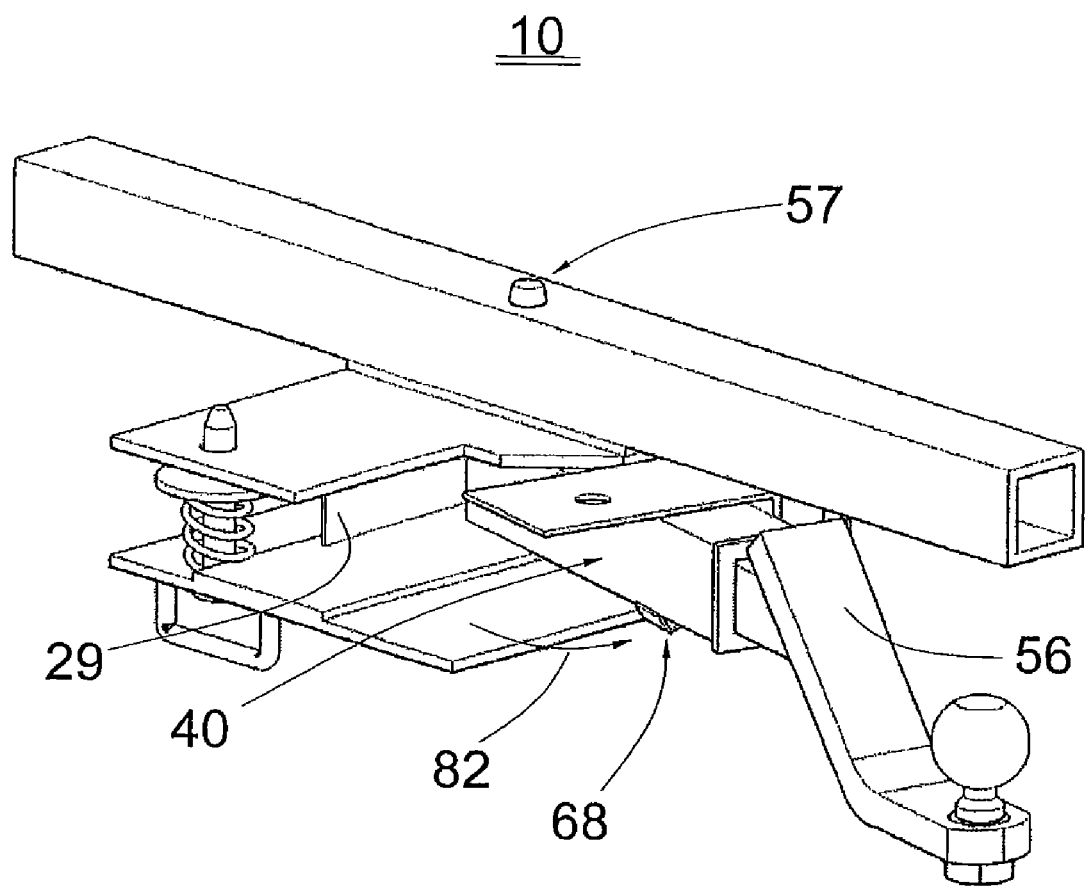
FIG. 7 an isometric view of the configurable trailer hitch in the storage position.

Now referring to FIG. 7 the configurable trailer hitch 10 is shown in a storage position. Here, the hitch receiver 40 and the hitch ball assembly 56 have been rotated about the pivot 57 in a direction generally indicated by the arrow 82 to engage the latch 68.

OPERATION

The operation of the present invention is believed to be readily apparent and is briefly summarized in the paragraphs which follow.

In operation, the trailer hitch apparatus 10 is placed in the towing position as shown in FIG. 1 from the intermediate position shown in FIG. 6 by means of swinging the hitch receiver 40 in a direction opposite that indicated by the arrow designated with the numeral 80 (FIG. 6), and simultaneously exerting a downward force on the retaining pin 64, until the hitch receiver 40 encounters the backstop plate 29. In this position, the aperture 50 formed in the wing 48 (FIG. 4) of the hitch receiver 40 becomes aligned with the retaining pin 64. Once this is achieved, the retaining pin 64 is released so that it engages with the aperture 50 formed in the wing 48 of the hitch receiver 40, holding the hitch receiver 40 in place against the backstop plate 29.

Referring both to FIG. 1 and to FIG. 4, the frame member 12 is adapted to mount to a towing vehicle (not shown) which is operable to exert a tractor or pulling force on a load (not shown) through the hitch ball assembly 56. The hitch ball assembly 56 is fastened to the hitch receiver 40 in a manner discussed earlier in this specification. The hitch receiver 40 is maintained in the towing position, as shown in FIG. 1, by means of engagement, wherein the retaining pin 64 is inserted through the aperture 50 of the wing 48 of the hitch receiver 40 holding the hitch receiver 40 against the backstop plate 29. The hitch receiver 40 is supported by the second spacer plate 32 of the bottom weldment 28 (FIG. 3) and is guided by the top plate 18. The hitch receiver 40 is pivotally supported by the pivot 57, providing a means for the tractor or towing force 66 to be centered about the pivot 57.

Now referring to FIGS. 1, 6, and 7, the trailer hitch apparatus 10 is placed in the storage position as shown in FIG. 7 from the towing position shown in FIG. 1 by means of exerting a downward force on the retaining pin 64, and then swinging the hitch receiver 40 in a direction toward the frame member 12 as indicated by the arrow generally indicated by the numeral 80 (FIG. 6) causing it to move through the intermediate position shown in FIG. 6, and continuing to swing the hitch receiver so that it engages the storage latch 68 with the outer lip 71 extending beyond the hitch receiver 40 as shown in FIG. 7.

Now referring to FIG. 6 and FIG. 7, the trailer hitch apparatus 10 is placed in the intermediate position as shown in FIG. 6 from the storage position FIG. 7 by exerting a downward force on the outer lip 71 of the storage latch 68, and by swinging the hitch receiver 40 in a direction opposite of that shown by the arrow generally designated by the numeral 82 (FIG. 7).

In compliance with the statute, the invention has been described in language more or less specific as to structural and methodical features. It is to be understood, however, that the invention is not limited to the specific features shown and describe, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A hitch apparatus comprising:
   a frame member configured to be secured to a towing vehicle;
   a pivot pin in the frame member;
   a latch secured to the frame member;
   a hitch structure pivotably secured to the pivot pin and capable of pivoting between a towing position and a storage position, the storage position comprising the hitch structure secured to the latch;
   a retaining pin configured for securing the hitch structure in a stationary position; and
   wherein an entirety of the structure of the retaining pin is spaced from the hitch structure.

2. The hitch apparatus of claim 1 wherein the latch comprises a strip of metal.

3. The hitch apparatus of claim 1 wherein the latch comprises a strip of metal comprising a receiving section to receive the hitch structure and an outer lip extending at an angle relative the receiving section, the outer lip maintains the hitch structure in receipt with the receiving section.

4. The hitch apparatus of claim 1 wherein the frame member comprises a tubular structure.

5. The hitch apparatus of claim 1 wherein the hitch structure comprises a hitch slidingly engaging a hitch receiver, and wherein the retaining pin secures the hitch structure without contacting either the hitch or the hitch receiver.

6. The hitch apparatus of claim 1 wherein the hitch structure comprises a hitch slidingly engaging a hitch receiver, and wherein the retaining pin secures the hitch structure without intersecting structure of either the hitch or the hitch receiver.

7. The hitch apparatus of claim 1 wherein the retaining pin secures the hitch structure with axial movement generally parallel with the orientation of the pivot pin.

8. A hitch apparatus comprising:
- a frame member configured to be secured to a towing vehicle;
- a pivot pin in the frame member;
- a latch secured to the frame member;
- a hitch structure pivotably secured to the pivot pin and capable of pivoting between a towing position and a storage position, the storage position comprising the hitch structure secured to the latch;
- a retaining pin configured for securing the hitch structure in a stationary position; and
- wherein the hitch structure comprises a hitch slidingly engaging a hitch receiver, and wherein the retaining pin secures the hitch structure without contacting either the hitch or the hitch receiver.

9. A hitch apparatus comprising:
- a frame member configured to be secured to a towing vehicle;
- a pivot pin in the frame member;
- a latch secured to the frame member;
- a hitch structure pivotably secured to the pivot pin and capable of pivoting between a towing position and a storage position, the storage position comprising the hitch structure secured to the latch;
- a retaining pin configured for securing the hitch structure in a stationary position; and
- wherein the hitch structure comprises a hitch slidingly engaging a hitch receiver, and wherein the retaining pin secures the hitch structure without intersecting structure of either the hitch or the hitch receiver.

* * * * *